(12) United States Patent
Wu et al.

(10) Patent No.: US 10,066,374 B2
(45) Date of Patent: Sep. 4, 2018

(54) SINGLE BUTTON, CYCLIC SHOWER HEAD SWITCH

(71) Applicants: XIAMEN SOLEX HIGH-TECH INDUSTRIES CO., LTD., Xiamen, Fujian (CN); Huasong Zhou, Xiamen, Fujian (CN)

(72) Inventors: Pengfei Wu, Fujian (CN); Youxian Hu, Fujian (CN); Gangqiang Wu, Fujian (CN); Bin Chen, Xiamen (CN)

(73) Assignee: XIAMEN SOLEX HIGH-TECH INDUSTRIES CO., LTD., Xiamen (CN)

( * ) Notice: Subject to any disclaimer, the term of this patent is extended or adjusted under 35 U.S.C. 154(b) by 217 days.

(21) Appl. No.: 15/056,285

(22) Filed: Feb. 29, 2016

(65) Prior Publication Data

US 2017/0067574 A1   Mar. 9, 2017

(30) Foreign Application Priority Data

Sep. 9, 2015   (CN) .................... 2015 2 0694461 U (51) Int. Cl.
| | |
|---|---|
| E03C 1/02 | (2006.01) |
| E03C 1/04 | (2006.01) |
| F16K 31/528 | (2006.01) |
| F16K 11/044 | (2006.01) |
| B05B 1/18 | (2006.01) |
| B05B 1/16 | (2006.01) |

(52) U.S. Cl.
CPC .......... *E03C 1/0404* (2013.01); *F16K 11/044* (2013.01); *F16K 31/528* (2013.01); *B05B 1/1618* (2013.01); *B05B 1/18* (2013.01); *E03C 1/02* (2013.01); *E03C 1/0405* (2013.01); *E03C 2001/0415* (2013.01)

(58) Field of Classification Search
CPC ........ E03C 1/0404; E03C 1/0405; E03C 1/02; E03C 2001/0415; B05B 1/1618; B05B 1/18; F16K 11/044; F16K 31/528
See application file for complete search history.

(56) References Cited

U.S. PATENT DOCUMENTS 4,082,225 A * 4/1978 Haynes ................... E03C 1/084
                                                            239/428.5
6,370,713 B2 * 4/2002 Bosio .................... B05B 1/1618
                                                            239/441

(Continued)

*Primary Examiner* — Matthew W Jellett
*Assistant Examiner* — Christopher Ballman
(74) *Attorney, Agent, or Firm* — Rabin & Berdo, P.C.

(57) ABSTRACT

A single button, cyclic shower head switch includes a main body having a button opening and at least two outlet passages; a reversing shaft disposed in the main body by a connecting element having a pivot, that has a sealing pad and one end having a spherical surface including a top face and a bottom face, and is configured to move along the axis of the main body; and a reversing button movably coupled to the pivot, that protrudes from the button opening, and is disposed with a guiding groove coupled to the spherical surface of the reversing shaft. When the reversing button is switched, the guiding groove moves circularly about the pivot and abuts against the spherical surface and causes the reversing shaft to move downwardly or upwardly along the axis of the main body so that the sealing pad closes one outlet passage and opens another outlet passage.

16 Claims, 5 Drawing Sheets

(56) References Cited

U.S. PATENT DOCUMENTS

| | | | | |
|---|---|---|---|---|
| 7,331,536 | B1* | 2/2008 | Zhen | B05B 1/1618 |
| | | | | 137/625.48 |
| 7,344,095 | B1* | 3/2008 | Hsu | B05B 1/1618 |
| | | | | 239/444 |
| 7,380,731 | B1* | 6/2008 | Hsu | B05B 1/1618 |
| | | | | 239/391 |
| 7,748,406 | B2* | 7/2010 | Pilatowicz | E03C 1/08 |
| | | | | 137/603 |
| 9,175,459 | B2* | 11/2015 | Zhang | B05B 1/1618 |
| 9,322,152 | B2* | 4/2016 | Kawamoto | E03C 1/046 |
| 9,421,561 | B2* | 8/2016 | Yaita | B01F 3/04007 |
| 9,504,968 | B2* | 11/2016 | Takano | B01F 3/04241 |
| 9,550,195 | B1* | 1/2017 | Cao | B05B 1/185 |
| 2015/0352503 | A1* | 12/2015 | Lai | B01F 3/04106 |
| | | | | 261/121.1 |
| 2016/0145842 | A1* | 5/2016 | Yaita | B05B 1/1636 |
| | | | | 239/428.5 |

* cited by examiner

SINGLE BUTTON, CYCLIC SHOWER HEAD SWITCH

FIELD OF THE INVENTION

The present invention relates to an outlet switch component, especially to a single button cyclic switch component.

BACKGROUND OF THE INVENTION

In the kitchen, traditional faucets can not meet people's needs more. Traditional faucets have the outlet diversion, the outlet mode and the length fixed. To solve the problems, there are kitchen shower heads. A kitchen shower head can switch the outlet mode, the shower head can extend or withdraw as it is connected by a water pipe, the outlet direction of the shower head can be adjusted by the user, so that it is convenient to use. However, the kitchen shower head has disadvantages: it feels hard when switched, it needs large force to switch the outlet mode. The structure of the shower head would be unstable after long time's usage, large water pressure may damage the shower head. On the other hand, the outlet mode switch structure is usually parallel to the radial direction of the housing, it restricts to the housing size in the radial direction, the housing can not be made small, thus making it unattractive in the appearance and unsuitable to the overall style.

SUMMERY OF THE INVENTION

The present invention relates to a single button cyclic switch component, which achieves cyclic switching two water effects by one button, it is simple to assemble, it has stable structure and no idling happens during the operation.

To solve above mentioned problems, the present invention provides a single button cyclic switch component, which comprises:

a hollow main body with a button opening; the main body is disposed with at least an outlet passage;

a reversing shaft, the reversing shaft is disposed in the main body by a connecting element, the reversing shaft can move along the axis of the main body;

a reversing button, the reversing button is movably coupled to the pivot of the connecting element, the reversing button is exposed out of the button opening so as to allow the reversing button to switch in different positions; the reversing button is disposed with a guiding groove coupled to the end of the reversing shaft, when the reversing button is switched in different positions, the guiding groove moves circularly about the pivot, so that the guiding groove abuts against the top end face or the bottom end face of the end of the reversing shaft, the abutting force makes the reversing shaft move downwardly or upwardly along the axis of the main body;

the reversing shaft is disposed with a sealing pad, when the reversing shaft moves downwardly or upwardly along the axis of the main body, the sealing pad closes one of the outlet passage and opens the other outlet passage.

In another preferred embodiment, the connecting element is disposed with an accommodating chamber to hold the reversing shaft; the connecting element is further disposed with a flowing passage; the flowing passage is connected to the side wall of the accommodating chamber by a hole; when the reversing shaft moves downwardly or upwardly along the axis of the main body, the sealing pad closes the bottom end face or top end face of the hole.

In another preferred embodiment, the main body is disposed with two outlet passages, the bottom end face of the hole is connected to the first outlet passage; the top end face of the hole is connected to the second outlet passage.

In another preferred embodiment, the outlet of the first outlet passage is disposed at the centre of the bottom surface of the main body; the outlet of the second outlet passage is disposed at the external periphery of the outlet of the first outlet passage.

In another preferred embodiment, the accommodating chamber is disposed with an elastic element therein along the axis of the main body coupled to the reversing shaft; when the reversing shaft moves downwardly along the axis of the main body, the elastic element stores energy under pressure; the elastic force is larger than the force required to push the reversing shaft back to the initial position, and is smaller than the total force of necessary force to push the reversing shaft back to the initial position and the water pressure on the sealing pad.

In another preferred embodiment, the side surface of the connecting element is disposed with a protruding portion incline to the button opening; the top end of the protruding portion is disposed with a rotating shaft.

In another preferred embodiment, the reversing button is disposed with a concave slot coupled to the rotating shaft in rotating way.

In another preferred embodiment, the reversing button is further disposed with an elastic groove at the external side of the concave slot.

In another preferred embodiment, the end of the reversing shaft is disposed with a spherical surface, the spherical surface slides in the guiding groove of the button.

In another preferred embodiment, the first outlet passage outflows bubble water, the second outlet passage outflows shower water.

Compared to the existing technology, the technical proposal of the present invention has advantages as follows:

1. the single button cyclic switch component of the present invention has the reversing button movably coupled to the pivot, when pressing the reversing button down, the guiding groove of the end of the reversing button moves circularly about the pivot; so that the top end face of the guiding groove presses the reversing shaft, or the bottom end face of the guiding groove pushes the reversing shaft, therefore the reversing shaft moves upwardly or slides downwardly along the axis direction, so as to open the first outlet passage or the second outlet passage. It thus achieves cyclic switch, the assembly is simple, the structure is relatively stable so as to ensure long service time. In addition, as the guiding groove of the end of the button moves circularly about the pivot, the end of the reversing shaft is designed to be spherical, the guiding groove changes its position and acts on the end of the reversing shaft under the action of the button, so that no idling happens during the operation, it avoids the response delay of the switch, ensures the continuity of switching. In addition, as the water flows from the flowing passage through the hole then flows laterally into the accommodating chamber that is axially switching. It reduces the space of the structure in the radial direction, so that the diameter of the main body can be made smaller.

2. the single button cyclic switch component of the present invention is provided that, with the elastic element and the proper designation of the elastic force of the elastic element under pressure, when the water supply is turned off, the elastic element drives the reversing shaft to reset automatically. And as the directions of the elastic force and the water pressure on the sealing pad are opposite, it reduces the switch force of the user pressing the reversing button, it also improves the press hand feel of the user.

3. the single button cyclic switch component of the present invention is provided that, the reversing button is disposed with an elastic groove at the external side of the concave slot, the elastic groove is pressed or reset with the rotating coupling of the concave slot and the pivot, it improves the smooth degree of the coupling of the concave slot and the pivot, thus improving the hand feel.

4. the single button cyclic switch component of the present invention is provided that, the first outlet passage outflows bubble water, the second outlet passage outflows shower water, the shower head has two outlet modes that are usually used in a kitchen shower head. Furthermore, the default outlet state is bubble water, it improves the degree of humanization.

DETAILED DESCRIPTION OF THE EMBODIMENTS

The present invention will be further described with the drawings and the embodiments.

Referring to FIGS. 1-5, the single button cyclic switch component comprises:

a hollow main body 1 with a button opening 11; the main body 1 is disposed with a first outlet passage 12 and a second outlet passage 13; this embodiment takes two outlet passages for example, an outlet passage or more than two are available, they are simple substitutions, it would not further described hereafter.

A reversing shaft 21, the reversing shaft 21 is disposed in the main body 1 by a connecting element, the reversing shaft can move along the axis of the main body 1;

A reversing button 3, the reversing button 3 is movably coupled to the pivot 22 of the connecting element 2, the reversing button 3 is exposed out of the reversing button opening 11 so as to achieve the reversing button 3 switching between a first position and a second position; the reversing button 3 is disposed with a guiding groove 31 connected to the end of the reversing shaft 21; when the reversing button 3 is switched between the first position and the second position, the guiding groove 31 moves circularly about the pivot 22, so that the guiding groove 31 abuts against the top end face or the bottom end face of the end of the reversing shaft 21, the abutting force makes the reversing shaft 21 move downwardly or upwardly along the axis of the main body 1;

the reversing shaft 21 is disposed with a sealing pad 23, when the reversing shaft 21 moves downwardly or upwardly along the axis of the main body, the sealing pad 23 closes one of the first outlet passage 12 or the second outlet passage and opens the other outlet passage.

Therefore, above mentioned structure of a single button cyclic switch component has the reversing button 3 spherically coupled to the pivot 22, when pressing the reversing button 3 down, the guiding groove 31 of the end of the reversing button 3 moves circularly about the pivot 22; so that the top end face of the guiding groove presses the reversing shaft 21, or the bottom end face of the guiding groove 31 pushes the reversing shaft 21, therefore the reversing shaft 21 moves upwardly or slides downwardly along the axis direction. The first outlet passage 12 or the second outlet passage 13 is open. It thus achieves cyclic switch, the assembly is simple. And it has well switch feel as it is spherically switching.

Figure 2:
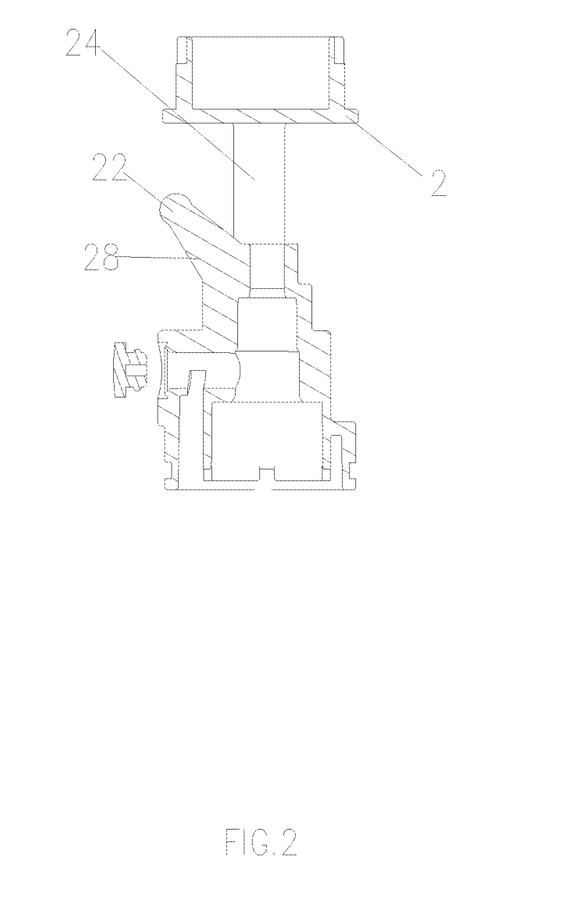
FIG. 2 illustrates a sectional diagram of a connecting element of the preferred embodiment of the present invention.
Figure 3:
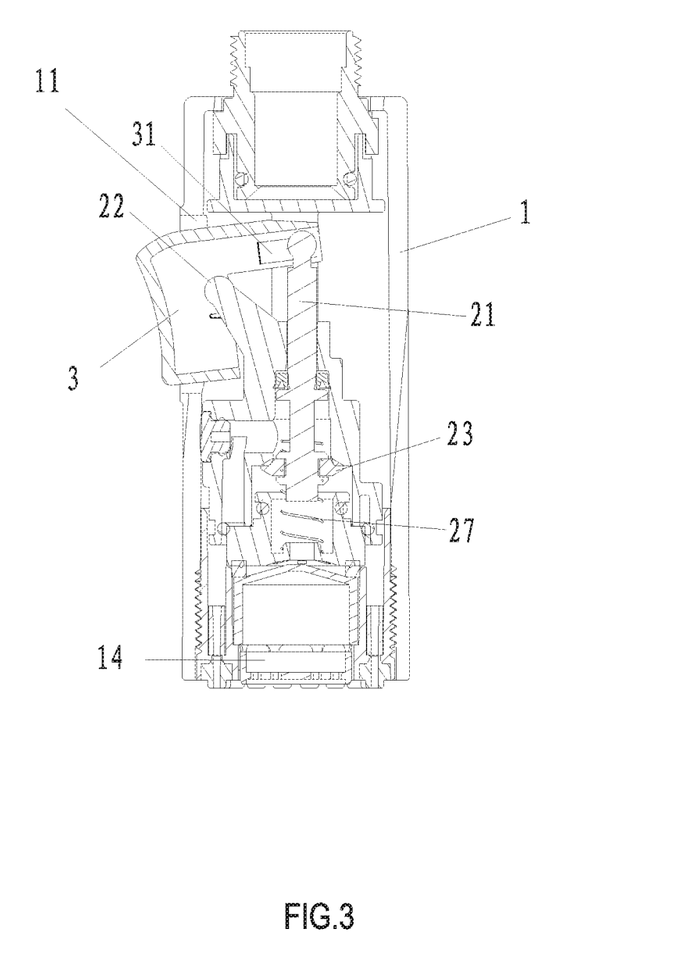
FIG. 3 illustrates a sectional diagram of the kitchen shower head of the preferred embodiment of the present invention.
Figure 4:
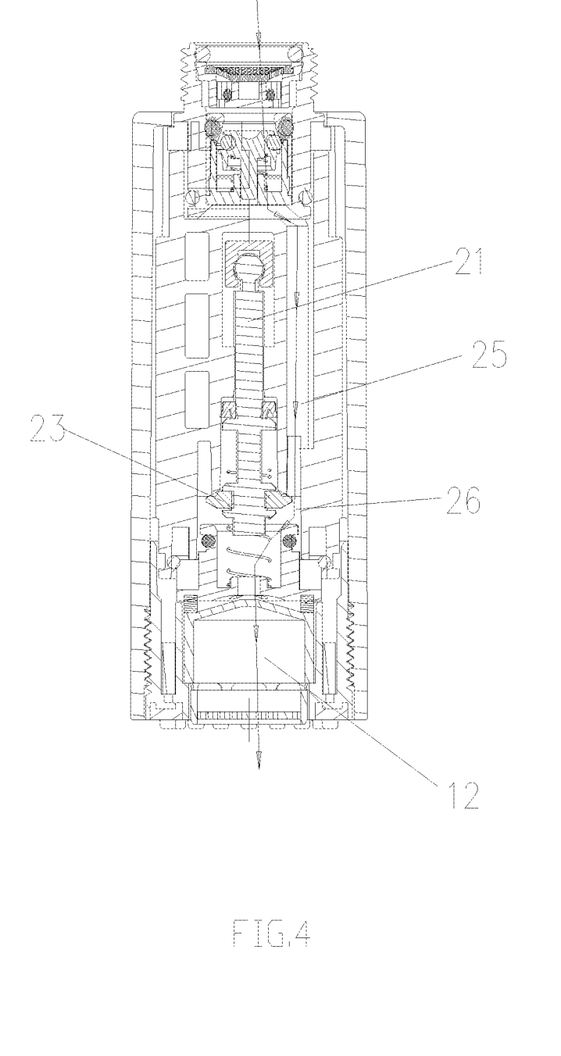
FIG. 4 illustrates a sectional diagram of the preferred embodiment of the present invention when the first outlet passage is open in side view angle.
Figure 5:
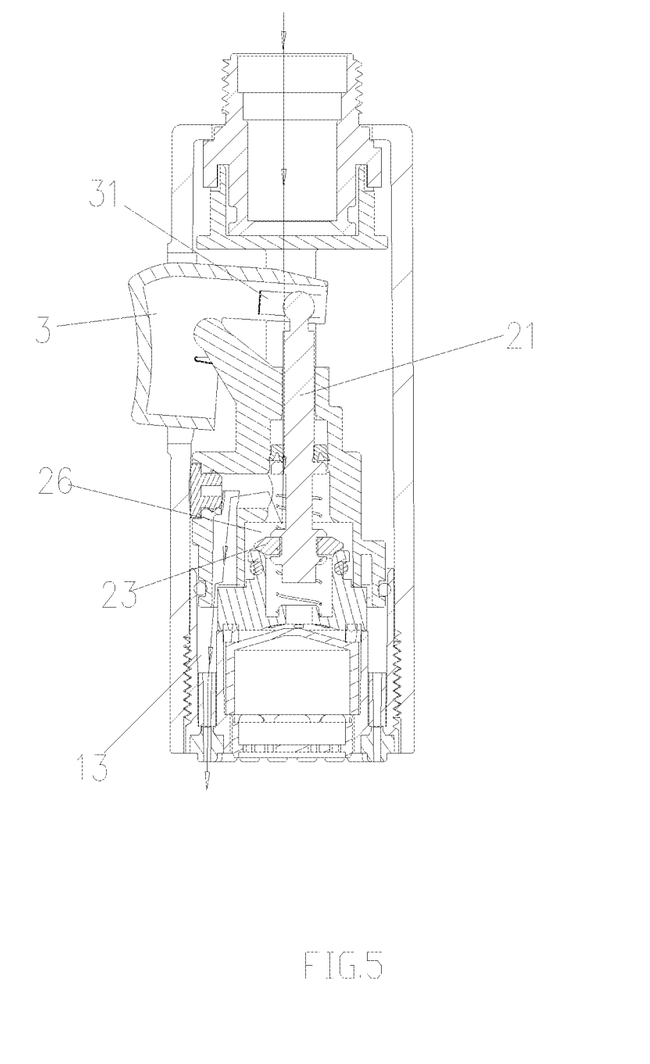
FIG. 5 illustrates a sectional diagram of the preferred embodiment of the present invention when the second outlet passage is open in front view angle.

The detail structure of the kitchen shower head is that: the connecting element 2 is disposed with an accommodating chamber 24 to hold the reversing shaft 21, the connecting element 2 is further disposed with a flowing passage 25; the flowing passage 25 is connected to the side wall of the accommodating chamber 24 by a hole 26; when the reversing shaft 21 moves downwardly or upwardly along the main body 1, the sealing pad 23 closes the bottom end face or the top end face of the hole 26. As the reversing shaft 21 and the flowing passage 25, except the hole 26, are mutual independent, the reversing shaft 21 would not affect the flowing of the flowing passage 25, at the same time, the reversing shaft moves upwardly or downwardly to make the sealing pad 23 close the bottom end face or the top end face of the hole 26, the bottom end face of the hole 26 is connected to the first outlet passage 12, the top end face of the hole 26 is connected to the second outlet passage 13. It can accomplish that when the reversing shaft 21 moves upwardly or downwardly, the first outlet passage 12 or the second outlet passage 13 is open. In addition, as the water flows from the flowing passage 25 through the hole 26 then flows laterally into the accommodating chamber 24, that is axially switching. It reduces the space of the structure in the radial direction, so that the diameter of the main body can be made smaller.

This embodiment can be preferred designed that: an elastic element 27 coupled to the reversing shaft 21 is disposed in the accommodating chamber 24 along the axis of the main body; when the reversing shaft 21 moves downwardly along the axis of the main body 1, the elastic element 27 stores energy under pressure; the elastic force is larger than the force of the reversing shaft 21 pushing back to the initial position, and is smaller than the total force of the reversing shaft 21 pushing back to the initial position and the water pressure on the sealing pad 23. with the elastic element 27 and the proper designation of the elastic force of the elastic element under pressure, when the water supply is turned off, the elastic element 27 drives the reversing shaft 21 to reset automatically. And as the directions of the elastic force and the water pressure on the sealing pad 23 are opposite, it reduces the switch force of the user pressing the reversing button 3, it also improves the press hand feel of the user.

Furthermore, the side surface of the connecting element 2 is disposed with a protruding portion 28 incline to the button opening 11; the top portion of the protruding portion 28 is the pivot 22.

Figure 1:
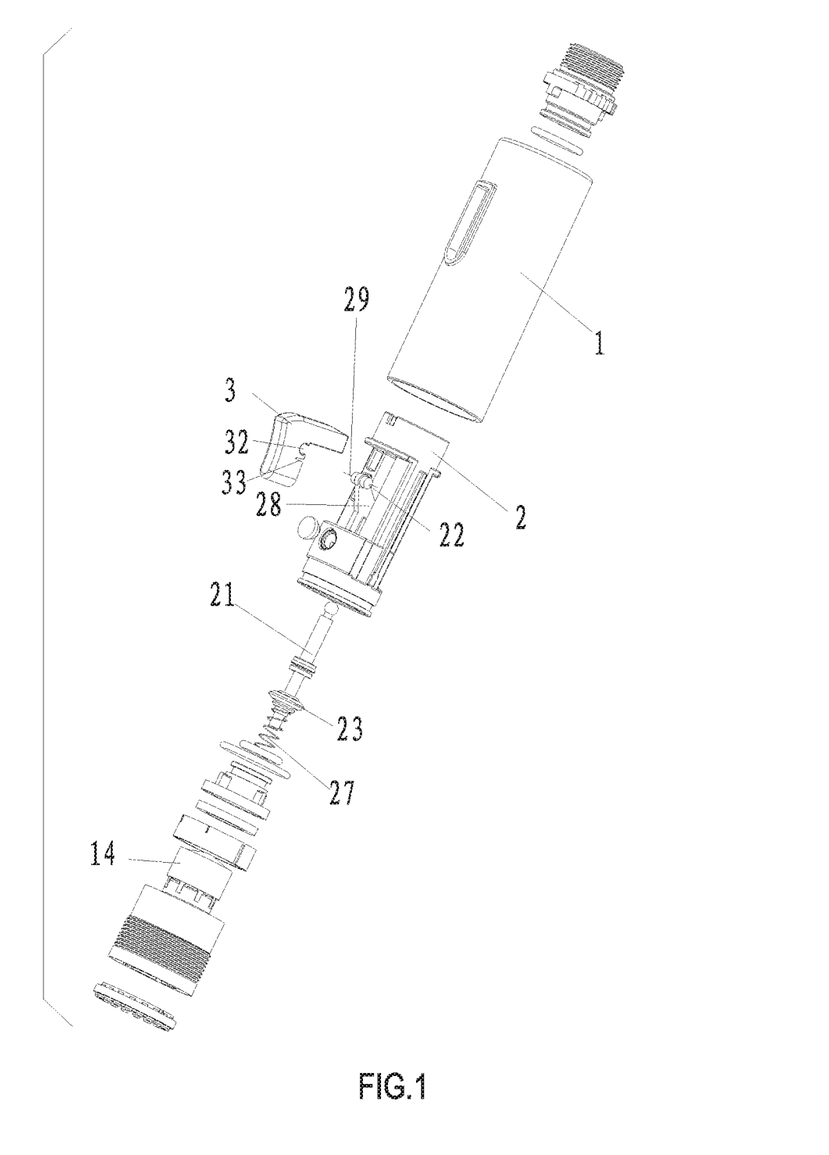
FIG. 1 illustrates an exploded and schematic diagram of a kitchen shower head of a preferred embodiment of the present invention.

The reversing button 3 is disposed with a concave slot 32 coupled to the pivot 22 in rotating way. The reversing button 3 is disposed with an elastic groove 33 at the external side of the concave slot 32. The elastic groove 33 is pressed or reset with the rotating coupling of the concave slot 32 and the pivot 22, it improves the smooth degree of the coupling of the concave slot 32 and the pivot 22, thus improving the hand feel, it also reduces the friction of the spherical concave groove 32 and the pivot 22.

The end of the reversing shaft 21 is a spherical surface, it is coupled to the guiding groove 31 by the spherical surface. As the guiding groove 21 at the end of the button 3 moves circularly about the pivot 22, the end of the reversing shaft 21 is designed to be spherical, the guiding groove 31 changes its position and acts on the end of the reversing shaft under the action of the button 3, so that no idling happens during the operation, it avoids the response delay of the switch, ensures the continuity of switching.

In this embodiment, the outlet of the first outlet passage 12 is disposed at the centre of the bottom surface of the main body 1; the outlet of the second outlet passage 13 is disposed at the external periphery of the outlet of the first outlet passage. And the first outlet passage 12 outflows bubble water, the second outlet passage 13 outflows shower water.

Therefore, a aerator 14 is further disposed in the main body 1, the outlet port of the aerator 14 is connected to the outlet of the first outlet passage 12. As the first outlet passage 12 outflows bubble water, the second outlet passage 13 outflows shower water, the shower head has two outlet modes that are usually used in a kitchen shower head. Furthermore, the default outlet state is bubble water, it improves the degree of humanization.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A single button, cyclic shower head switch comprising:
   a main body that is hollow, that has an axis, that has a button opening and that has at least two outlet passages;
   a reversing shaft that is disposed in the main body by a connecting element having a pivot, that is disposed with a sealing pad, that has one end having a spherical surface including a top face and a bottom face, and that is configured to move along the axis of the main body; and
   a reversing button that is movably coupled to the pivot of the connecting element, that protrudes from the button opening so as to allow the reversing button to switch from one position to another position, and that is disposed with a guiding groove coupled to the spherical surface of the end of the reversing shaft,
   wherein, when the reversing button is switched from one position to another position, the guiding groove moves circularly about the pivot, so that the guiding groove abuts against the top face or the bottom face of the spherical surface of the one end of the reversing shaft and the spherical surface slides in the guiding groove, and so that the abutting by the guiding groove causes the reversing shaft to move downwardly and upwardly along the axis of the main body, and
   wherein, when the reversing shaft moves downwardly or upwardly along the axis of the main body, the sealing pad closes one of the at least two outlet passages and opens another of the at least two outlet passages.

2. The single button, cyclic shower head switch according to claim 1, wherein the connecting element is disposed with an accommodating chamber to hold the reversing shaft and is disposed with a flow passage connected to a side wall of the accommodating chamber via a hole having a bottom end face and a top end face, and wherein, when the reversing shaft moves downwardly or upwardly along the axis of the main body, the sealing pad closes the bottom end face or top end face of the hole.

3. The single button, cyclic shower head switch according to claim 2, wherein the at least two outlet passages of the main body comprises a first outlet passage and a second outlet passage, wherein the bottom end face of the hole is connected to and communicates with the first outlet passage, and wherein the top end face of the hole is connected to and communicates with the second outlet passage.

4. The single button, cyclic shower head switch according to claim 3, wherein the main body has a bottom surface, wherein the first outlet passage has an outlet that is disposed at a center of the bottom surface of the main body, and wherein the second outlet passage has an outlet that is disposed at an external periphery of the outlet of the first outlet passage.

5. The single button, cyclic shower head switch according to claim 4, wherein the first outlet passage outflows bubble water, and the second outlet passage outflows shower water.

6. The single button, cyclic shower head switch according to claim 3, wherein the first outlet passage outflows bubble water, and the second outlet passage outflows shower water.

7. The single button, cyclic shower head switch according to claim 2, wherein the accommodating chamber is disposed with an elastic element therein along the axis of the main body coupled to the reversing shaft, and wherein, when the reversing shaft moves downwardly along the axis of the main body, the elastic element stores energy under pressure and has an elastic force that is larger than a force required to push the reversing shaft back to an initial position and is smaller than a total force necessary to push the reversing shaft back to the initial position and a force of water pressure on the sealing pad.

8. The single button, cyclic shower head switch according to claim 7, wherein the first outlet passage outflows bubble water, and the second outlet passage outflows shower water.

9. The single button, cyclic shower head switch according to claim 2, wherein the connecting element has a side surface that is disposed with a protruding portion that is inclined with respect to the button opening and that has a top end that is disposed with a rotating shaft.

10. The single button, cyclic shower head switch according to claim 9, wherein the reversing button is disposed with a concave slot coupled to the rotating shaft that is disposed on the top end of the protruding portion in a rotating way.

11. The single button, cyclic shower head switch according to claim 10, wherein the reversing button is further disposed with an elastic groove at an external side of the concave slot.

12. The single button, cyclic shower head switch according to claim 11, wherein the first outlet passage outflows bubble water, and the second outlet passage outflows shower water.

13. The single button, cyclic shower head switch according to claim 10, wherein the first outlet passage outflows bubble water, and the second outlet passage outflows shower water.

14. The single button, cyclic shower head switch according to claim 9, wherein the first outlet passage outflows bubble water, and the second outlet passage outflows shower water.

15. The single button, cyclic shower head switch according to claim 2, wherein the first outlet passage outflows bubble water, and the second outlet passage outflows shower water.

16. The single button, cyclic shower head switch according to claim 1, wherein the first outlet passage outflows bubble water, and the second outlet passage outflows shower water.

\* \* \* \* \*